United States Patent [19]
von Meyerinck et al.

[11] Patent Number: 4,844,133
[45] Date of Patent: Jul. 4, 1989

[54] REFUELING SYSTEM, IN PARTICULAR FOR THE REFUELING OF AIRCRAFT HAVING HIGH-POSITIONED WINGS

[76] Inventors: Wolfgang von Meyerinck, Daubringer Strasse 43, D-6304 Lollar; Dietz von Meyerinck, Arnsburger Strasse 14, D-6302 Lich 2, both of Fed. Rep. of Germany

[21] Appl. No.: 116,494

[22] Filed: Nov. 4, 1987

[30] Foreign Application Priority Data

May 20, 1987 [DE] Fed. Rep. of Germany ....... 3716867

[51] Int. Cl.⁴ ............................ B65B 3/04; B67D 5/68
[52] U.S. Cl. .................................... 141/387; 137/615; 141/113; 141/382; 141/383
[58] Field of Search ............... 141/388, 389, 383, 387, 141/382, 113; 137/615

[56] References Cited

U.S. PATENT DOCUMENTS

| | | | |
|---|---|---|---|
| 2,948,306 | 8/1960 | Kuraeff | 141/388 X |
| 3,217,748 | 11/1965 | Harper | 141/388 X |
| 3,249,121 | 5/1966 | Bily | 141/388 X |
| 3,362,432 | 1/1968 | Jameson | 141/388 X |
| 3,498,325 | 3/1970 | Ashton et al. | 141/387 X |
| 3,805,834 | 4/1974 | Bily | 141/387 X |
| 3,891,004 | 6/1975 | Knight | 137/615 |
| 4,084,247 | 4/1978 | Ball | 141/387 X |
| 4,093,003 | 6/1978 | Miller et al. | 141/388 X |
| 4,202,372 | 5/1980 | Gibbons | 141/387 X |
| 4,276,917 | 7/1981 | Fujita | 141/387 |
| 4,653,554 | 3/1987 | von Meyerinck et al. | 141/387 |
| 4,658,873 | 4/1987 | von Meyerinck et al. | 141/387 |
| 4,658,874 | 4/1987 | von Meyerinck et al. | 141/387 |

FOREIGN PATENT DOCUMENTS

| | | | |
|---|---|---|---|
| 231504 | 2/1964 | Austria | 141/387 |
| 1058387 | 5/1959 | Fed. Rep. of Germany | 141/388 |
| 2255857 | 6/1973 | Fed. Rep. of Germany | 141/388 |
| 590012 | 3/1959 | Italy | 141/387 |
| 144193 | 5/1962 | U.S.S.R. | 141/387 |

Primary Examiner—Harvey C. Hornsby
Assistant Examiner—Stephen F. Gerrity
Attorney, Agent, or Firm—Flynn, Thiel, Boutell & Tanis

[57] ABSTRACT

A refueling system which has pipe sections connected by swivel joints and carried by carriages or wheels, in which on one of the pipe sections there is provided an end swivel joint for a hydrant coupling for connection to supply pipelines and on the other one of the pipe sections there is provided a further end swivel joint with a head piece and a refueling coupling which is used for connection to the tank, in particular an aircraft tank which is to be refueled or is to be emptied. The refueling system has, so that it can be utilized in the simplest manner for underwing refueling at high heights, a refueling tip with a lockable swivel joint, a concussion-spring unit for balancing the forces of weight and a guiding carriage elevationally adjustable on which a guiding carriage is secured pipe sections with swivel joints, which are provided with a coupling piece, which can be connected to a refueling coupling.

7 Claims, 4 Drawing Sheets

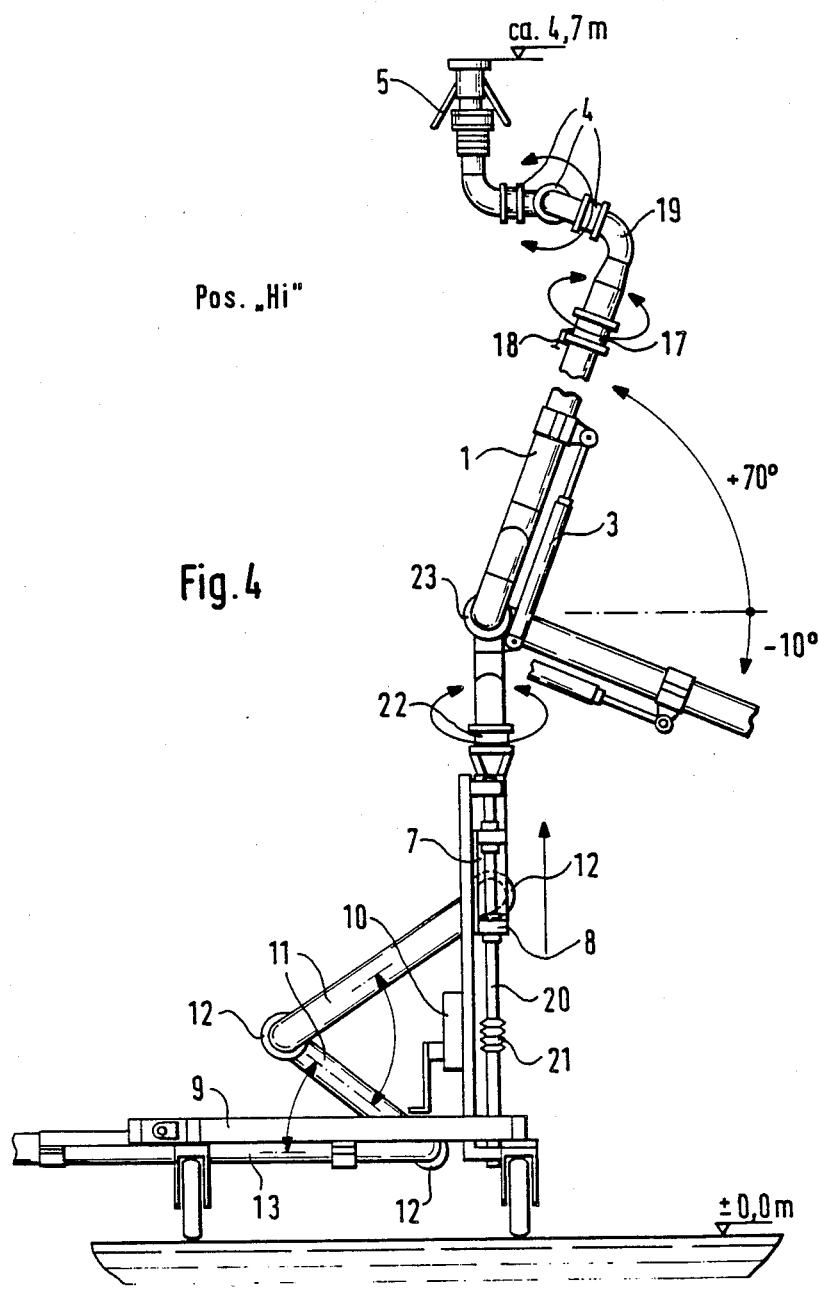

REFUELING SYSTEM, IN PARTICULAR FOR THE REFUELING OF AIRCRAFT HAVING HIGH-POSITIONED WINGS

FIELD OF THE INVENTION

The invention relates to a refueling system and, in particular, to an aircraft refueling system.

BACKGROUND OF THE INVENTION

During the refueling of vehicles, in particular aircraft, especially military aircraft, large amounts of fuel must be transferred in a very short period of time from a hydrant system or a tank truck into the tank to be filled on a vehicle or aircraft. Problematic during refueling are the last twenty to thirty meters, which are to be overcome from the refueling truck or the hydrant system to the tank to be filled.

To overcome this problem, it is known to use hoses, which have couplings at their ends, so that the refueling operation can occur directly after the connection to the fill opening of the respective tank. Hoses having a steel or Perlon insert are used, which as a rule have nominal widths of 2½ to a maximum of 3". However, handling of these hoses becomes more difficult and complicated with increasing nominal widths and longer hoses. With lengths of over 20 m., one is therefore forced to utilize hoses with smaller diameters, since these would otherwise hardly be manageable due to their heavy weight, because the hoses must be pulled or carried. A transport of the hoses from ony hydrant connection to the next one is as a rule hardly possible in the unrolled state, because the hoses must then be pulled over the ground, which, however, does not only require a high amount of force, but also significantly reduces the lifetime of the hoses because of the high friction with the ground.

It the hoses are stored in refueling shafts, they are exposed to additional wear, because they must be pulled over the edge of the shaft when they are being pulled out. Aside from these mechanical damages, the hoses also are exposed to a relatively great alteration process, so that these for safety reasons alone must be replaced periodically after a certain duration of use.

A further, by all means significant disadvantage in the use of hoses is that their use for defueling is very limited and that they can only be used in expensive special designs. Moreover, the hoses can be emptied only through complicated lifting. In particular, it has proven to be disadvantageous to connect the hoses to the aircraft refueling coupling due to the difficulty of handling a heavy weight and the tension of the hoses and, on the other hand, to expose the refueling coupling to a high moment through the hoses, which can result in damage.

Furthermore, pressure reliefs in hoses can be realized only with great difficulty. However, pressure reliefs are needed, since the high expansion coefficient of aircraft fuel causes a large volume increase due to the thermal effect. The thus caused pressure increase stretches the hoses, so that they can no longer be bent. Whereas dropping temperatures create an under pressure in the hoses, so that they can collapse and their reinforcements can break.

Furthermore hydrant vehicles with refueling armatures are known, which can be connected through hoses both to the hydrant and also the refueling coupling of the aircraft. The disadvantage of this hydrant vehicle consists in it, on the one hand, needing the hoses with the aforementioned disadvantages and, on the other hand, needing a separate energy source for winding up the hoses and to also increase the pressure in hose lines having a small cross section.

The above-disclosed disadvantages in using hoses for refueling show that, aside from the difficulties in handling and from the high wear which is to be expected, the refueling duration can hardly be further increased by the increase of the nominal widths of the hose, if one considers the disadvantage in the handling created by the increase of the nominal widths. Hoses represent, because of these susceptibilities and their sensitivity of heat, a high safety risk, in particular during use near running turbines and motors, as this is the case during the quick refueling of fighter aircraft. The described disadvantages require at the same time an intensive servicing and testing operation, which must occur prior to and after each refueling operation.

Therefore, the basic purpose of the invention is to provide a refueling system of the above-mentioned type, in which hoses are not needed and thus the handling difficulties caused by their use, greater wear and safety risks because of heat sensitivity do not exist, and which can be manufactured less expensively and has a greater durability without intensive servicing and testing operations. It furthermore has a high degree of flexibility in certain refueling areas, in particular in aircraft refueling, and its handling during refueling in the highest areas, for example during an under-wing refueling of certain aircraft types, is possible with less use of energy.

The advantages achieved with the invention consist substantially in hoses not being needed, since they, as is known, are difficult to handle and because of their heat sensitivity represent a high safety risk, in particular during their use near running turbines and motors, as this is the case during the quick refueling of fighter aircraft. The inventive refueling system can be manufactured inexpensively and has, because of less wear, a longer durability than the usual refueling systems which operate with hoses. Also, the servicing and testing operations of the inventive refueling system are much shorter than in the known systems. Due to the fact, that the inventive refueling system is equipped with a refueling tip and swivel joints, it has a high flexibility in particular at connecting heights of approximately 2.2 m. Through the initial tension of concussion springs of a concussion-spring unit, the refueling tip of the refueling system is balanced such that it always assumes the maximum deflection. Handling during refueling in the highest area, that is at approximately a 4.7 m. height, is possible with little use of energy, because only the weight of the uppermost tip of a combination consisting of three joints must be held and moved. Due to the fact that each horizontal and vertical movement of a refueling coupling can be converted into a rotary movement, it is assured that practically no forces or loads are transmitted onto the coupling on the aircraft. The inventive refueling system equipped with the refueling tip can be used universally for refueling heights of approximately 0.8 m (tank truck) and up to a height of 4.7 m., namely also for under-wing refueling, and is thus well suited for aircraft such as the DC 10, B747 and A300.

BRIEF DESCRIPTION OF THE DRAWINGS

One examplary embodiment of the invention is illustrated in the drawings and will be discussed in greater detail hereinafter.

In the drawings:

FIG. 4 is a side view of the inventive refueling system with the refueling tip in the uppermost position, which can be reached after a maximum upward swing of the refueling tip and turning of the refueling coupling by means of a joint combination, and with the guiding carriage in the elevated position.

DETAILED DESCRIPTION

Figure 1:
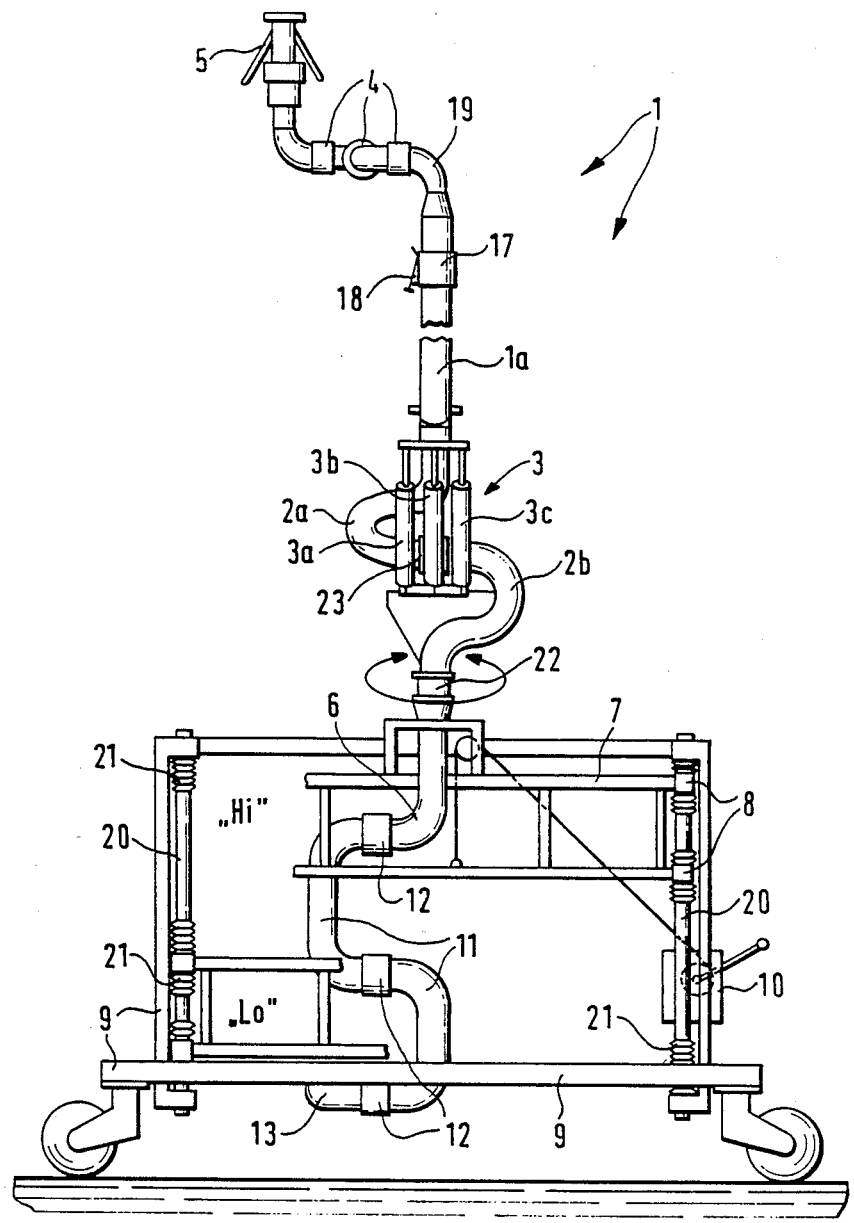
FIG. 1 is a front view of the inventive refueling system with the refueling tip in the high position and the guiding carriage elevated for an under-wing refueling.

FIG. 1 illustrates in a front view the inventive refueling system having a refueling tip 1 which can be used universally for refueling heights of approximately 0.8 m. (tank truck) and up to a 4.7 m. height. When the refueling tip is at the attainable height of 4.7 m., as illustrated, it is particularly suited for an under-wing refueling of aircraft, such as the DC 10, B747, and A300.

The refueling tip 1 consists of a pipe section 1a on which a lockable swivel joint 17 and a pipe bend 19 are arranged, which when an automatic lock 18 mounted on the lockable swivel joint 17 is released, can be pivoted at 180° about the axis of the pipe section 1a of the refueling tip 1. The lock 18 locks again immediately after the pivoting. This special design of the invention results in a high degree of flexibility of the refueling tip 1, namely in particular in the range of connecting heights of up to approximately 2.2. m.

The refueling tip 1 consists furthermore of a combination 4 connected to the pipe bend 19 and including three joints, with which combination a known refueling coupling 5 can be moved and can be adjusted elevationally in all three degrees of freedom. Since each horizontal or vertical movement of the refueling coupling 5 can be converted into a rotary movement of the combination 4 consisting of three joints, practically no forces or stresses are transmitted onto the connecting coupling, especially since concussion springs 3 substantially compensate for the weight.

The refueling tip 1 has first and second pipe bends 2a, 2b consisting of a pipe, and wherein a concussion-spring unit 3 consisting of three concussion springs 3a, 3b and 3c is secured on the first pipe bend 2a and at the end of the pipe section 1a. The concussion-spring unit 3 limits the adjusting forces to a minimum during an up and down swinging.

An elbow 6 is provided on the pipe bend 2b, with which elbow the refueling tip 1 is secured to a guiding carriage 7. The guiding carriage 7, which runs in highly exact linear bearings 8 on two guide shafts 20 of a wheeled carrier 9, can be moved, by turning a self-locking cable winch 10, upwardly into a high position or by the weight of the refueling tip 1 downwardly into a low position, not shown here. Since the cable winch 10 is self-locking, the guiding carriage 7 can be stopped in every position. However, only the high and low positions should be used for the refueling.

As is shown in FIG. 1 by an arrow ring at the end of the pipe bend 2b, the refueling tip 1 is rotatable horizontally through 360° with a swivel joint 22 arranged above the pipe bend 6 and can thus be moved into all desired horizontal refueling directions.

A further swivel joint 23 is provided on the pipe bend 2a opposite the concussion spring 3b of the concussion spring unit 3. The refueling tip 1 can be swung with the swivel joint 23 out of the horizontal position from −10° to +70°, in order to assume, as this will yet be shown, various elevational positions during refueling. In the elevated position illustrated in FIG. 1, the refueling tip is swung into the high position with the help of the swivel joint 23 and reaches here a refueling height of approximately 4.7 m., which is particularly suited, as already stated, for under-wing refueling of aircraft, such as the DC 10, B747 and A300. The guiding carriage 7 assumes thereby the position characterized in FIG. 1 with "Hi". Whereas, when the guiding carriage 7 is moved along the guide shaft 20 downwardly, then it reaches the position illustrated with "Lo", which will be discussed in greater detail later on.

The refueling tip 1 of the inventive refueling system is connected to a last pipe section 13 through a scissors pipe 11 having three joints 12. The pipe section 13 is fixedly screwed to the wheeled carrier 9. A conventional refueling arm (not shown) can be flanged to the pipe section 13 in order to receive a hydrant coupling (also not illustrated) for the connection to supply pipelines.

According to one embodiment of the invention, the refueling tip 1 can be swung from the horizontal position by the swivel joint 23 at −10° to up to +70°, so that the maximum high position of 4.7 m. or the low positions 14, 15, 16 (FIG. 3) can be achieved. In the maximum high position, a height of 4.7 m. is inventively achieved and in the low positions 14, 15 those between 0.6 and 2.2 m. Due to the fact that the refueling coupling 5 can be moved and adjusted in all three degrees of freedom with the combination 4 consisting of the three joints, it is possible at an adjusted swiveling position of the refueling tip 1, as will be discussed later on, to still change the position of the refueling coupling 5 for the purpose of elevational adjustment (for example FIG. 3).

The guiding carriage 7 is constructed preferably such that it can be stopped actually in every position between the achievable high and low positions 14, 15 through the self-locking cable winch 10.

The guide shafts 20 for moving the guiding carriage 7 are mounted laterally of the wheeled carrier 9, so that sufficient space exists for the scissors pipe 11 in the center area of the wheeled carrier 9, and have bellows 21 to protect against dirt.

Figure 2:
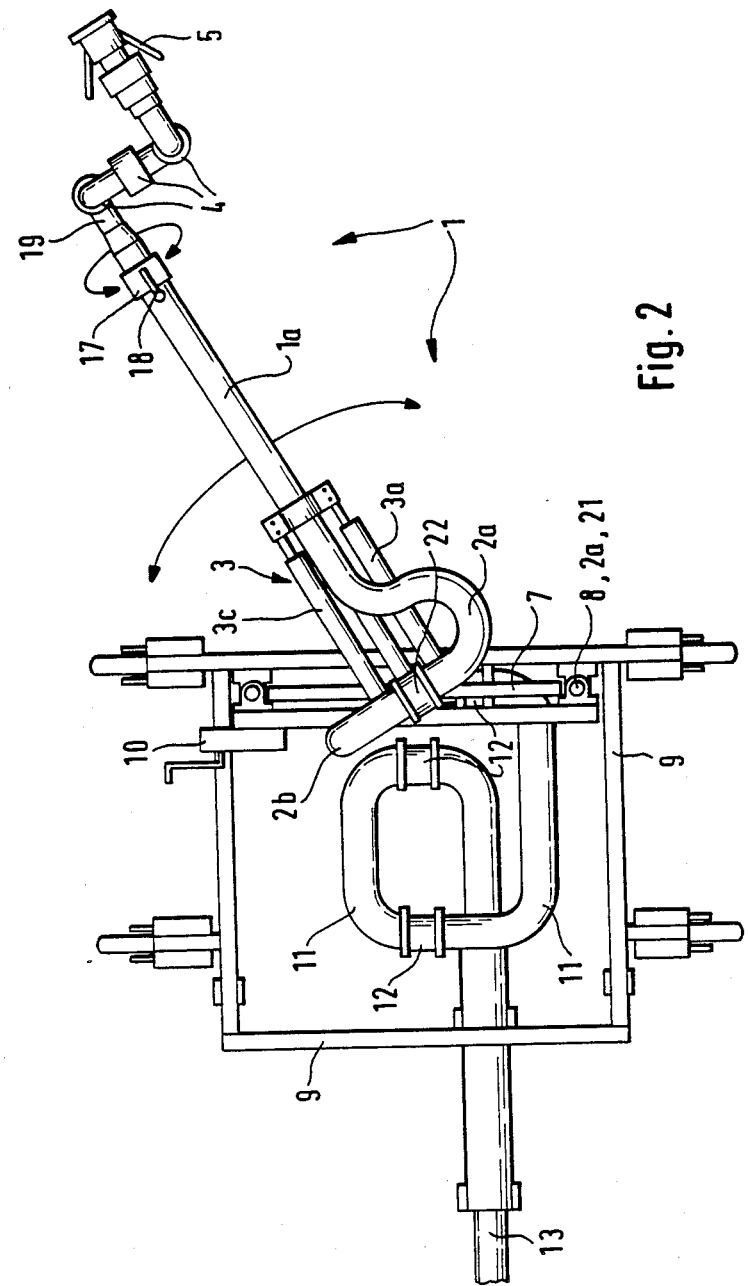
FIG. 2 is a top view of the inventive refueling system illustrated in FIG. 1.

FIG. 2 is a top view of the inventive refueling system illustrated in FIG. 1 with the refueling tip 1 horizontally rotatable about the swivel joint 22 and with the guiding carriage 7 in the high position. The refueling coupling 5 can be adjusted parallel with respect to the refueling tip 1 with the help of the combination 4 consisting of the three joints, which adjustment can occur when the pipe bend 10, after releasing the automatic lock 18 mounted on the lockable swivel joint 1, is pivoted 180° about the axis of the pipe section 1a of the refueling tip 1 and when the lock 18 is again locked.

The joints 12 of the scissors pipe 11 are clearly shown in the top view. Two concussion springs 3a and 3b of the concussion-spring unit 3 are illustrated on the pipe section 1a of the refueling tip 1. The concussion-spring unit 3, consisting of a total of three concussion springs 3a, 3b and 3c, assures with its initial tension that the refueling tip 1 is balanced so that it stops as much as possible in all positions, at least, however, around its center position and thus can be moved all over with little effort, since substantially only the weight of the uppermost tip with the three joints of the combination 4 need be held and moved.

Figure 3:
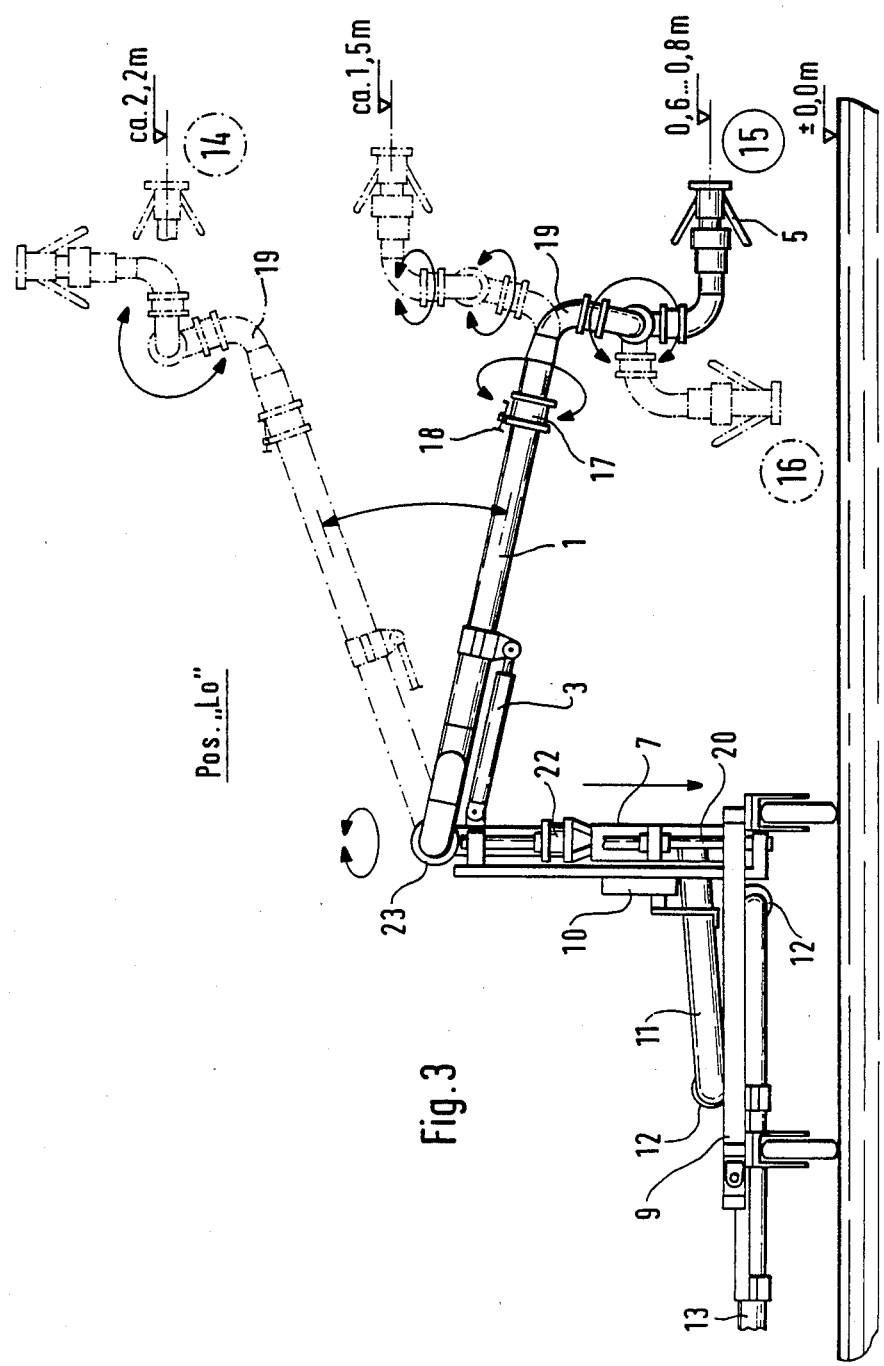
FIG. 3 is a side view of the inventive refueling system, in which the refueling tip is swung downwardly and in which the guiding carriage is in its low position.

FIG. 3 illustrates a side view of the inventive refueling system in which its refueling tip 1 is swung downwardly out of the position 14 with a height of approximately 2.2 m. by operating the swivel joint 23 to −10° into a position 15, and wherein the guiding carriage 7 is in its lowermost position. At a height of 2.2 m. (position 14), the refueling on aircraft connections can be carried out, and wherein the position of the refueling coupling 5 in addition is changeable in desired directions. At a position of 0.8 m. (position 15), a tank truck for refueling and a connection to a back-flushing pipeline at ground level (position 16) can be reached. By swiveling the pipe bend 19 180° upwardly, it is possible, by maintaining the swiveling position of the refueling tip 1 constant, to reach a height of approximately 1.5 m. for a further refueling purpose.

FIG. 4 illustrates a side view of the inventive refueling system with a maximum possible swinging out of the refueling tip 1 about the swivel joint 23 of up to +70°, and wherein the guiding carriage 7, which is moved into the uppermost position by the cable winch 10, is in the "Hi" position. The initial tension of the concussion springs 3a, 3b and 3c of the concussion-spring unit 3 is here too balanced such that it always assumes the maximum deviation. The refueling connections can, in the here illustrated highest position, be reached up to approximately 4.7 m. and are thus suited for under-wing refueling, in particular for aircraft, such as the DC 10, B747 and A300.

The embodiments of the invention in which an exclusive property or privilege is claimed are defined as follows:

1. In a refueling system comprising plural pipe sections connected by plurality swivel joint means and carried by a movable carrier means, a first end swivel joint means on a first of said pipe sections for facilitating a connection to supply pipelines, and a second end swivel joint means on a second of said pipe sections, said second end swivel joint means having a head piece means and a refueling coupling means thereon for facilitating a connection to a tank to be at least one of refueled and emptied, the improvement:
    (a) wherein said head piece means is a refueling tip having a lockable swivel joint with a releasable automatic lock means thereon and a first pipe section which is pivotal 180° about an axis of rotation, a releasing of said automatic lock means enabling said first pipe section and, therefore, said refueling tip to pivot 180° about said axis of rotation, after which said lockable swivel joint locks again;
    (b) wherein said refueling tip further includes, between said refueling coupling means and said lockable swivel joint, means defining three joints for moving and adjusting said refueling coupling means in three orthogonally related directions, one of said directions being parallel to said axis of rotation;
    (c) wherein a guiding carriage is provided on said movable carrier means;
    (d) wherein said refueling tip has, between said lockable swivel joint and said guiding carriage third and fourth pipe sections, in which one said third pipe section and at an end of a fifth pipe section extending between said lockable swivel joint and said third pipe section, there is secured a concussion-spring unit consisting of several concussion springs, which unit compensates for the weight of said refueling tip and reduces to a minimum the forces required for facilitating an up and down adjusting movement;
    (e) wherein an elbow means is secured to said guiding carriage and is connected to said fourth pipe section;
    (f) wherein said movable carrier means is provided with support means for supporting said guiding carriage for vertical movement, said support means including linear bearings provided on two guide shafts on said movable carrier means so as to facilitate movement up or down by means defining a self-locking cable winch also provided on said movable carrier means;
    (g) wherein a third swivel joint means is arranged above and between said lockable swivel joint and said second pipe section of said refueling tip to facilitate said refueling tip turning through 360°;
    (h) wherein a fourth swivel joint is provided between said third and fourth pipe sections adjacent said concussion spring unit to facilitate said refueling tip being swung out of a horizontal position to at least one of a maximum high position and low position relative to a support surface for said movable carrier means, and
    (i) wherein a last pipe section is connected to said elbow means through a movable scissors pipe means having three joints, which last pipe section is fixedly secured to said movable carrier means.

2. The refueling system according to claim 1, wherein said fourth swivel joint between said third and fourth pipe sections includes means for facilitating a swivelling of said first pipe section relative to said second pipe section between −10° and +70° relative to a horizontal plane, so that said high position and said low position can be reached.

3. The refueling system according to claim 2, wherein said refueling tip assumes, in said low position, elevational positions of between 0.6 and 2.2 m. for a horizontal connection and, in the high position, one of 4.7 m. for a vertical connection.

4. The refueling system according to claim 2, wherein at a height of 2.20 m. aircraft connections can be refueled.

5. The refueling system according to claim 2, wherein starting with a 0.8 m. height, tank trucks for refueling and for connection to a back-flushing pipeline at ground level can be reached.

6. A refueling system according to claim 2, wherein said guiding carriage can be stopped in every position between the attainable high and low positions by said means of said self-locking cable winch, and thus every in-between position between 2.20 and 4.70 m. for the refueling connections can be assumed.

7. The refueling system according to claim 1, wherein said two guide shafts are each oriented adjacent laterally spaced sides on said movable carrier means and are protected against dirt by bellows.

* * * * *

UNITED STATES PATENT AND TRADEMARK OFFICE
CERTIFICATE OF CORRECTION

PATENT NO. : 4 844 133
DATED : July 4, 1989
INVENTOR(S) : Wolfgang von MEYERINCK et al.

It is certified that error appears in the above-identified patent and that said Letters Patent is hereby corrected as shown below:

Column 5, line 41; change "plurality" to ---plural---.

Column 6, line 3; change "one" to ---on---.

Column 6, line 51; change "2.20 m." to ---2.20 m.,---.

Signed and Sealed this

Sixteenth Day of October, 1990

Attest:

HARRY F. MANBECK, JR.

*Attesting Officer*  *Commissioner of Patents and Trademarks*